US009055512B2

United States Patent
Pikkarainen et al.

(10) Patent No.: US 9,055,512 B2
(45) Date of Patent: Jun. 9, 2015

(54) METHODS AND APPARATUS FOR SECONDARY BANDWIDTH DETECTION AND ALLOCATION

(75) Inventors: Matti Juhani Pikkarainen, Oulu (FI); Sami-Jukka Hakola, Kempele (FI); Timo Kalevi Koskela, Oulu (FI)

(73) Assignee: NOKIA TECHNOLOGIES OY, Espoo (FI)

( * ) Notice: Subject to any disclaimer, the term of this patent is extended or adjusted under 35 U.S.C. 154(b) by 654 days.

(21) Appl. No.: 12/761,384

(22) Filed: Apr. 15, 2010

(65) Prior Publication Data

US 2011/0255425 A1 Oct. 20, 2011

(51) Int. Cl.
| | |
|---|---|
| G01R 31/08 | (2006.01) |
| H04W 48/08 | (2009.01) |
| H04W 16/14 | (2009.01) |
| H04W 72/04 | (2009.01) |

(52) U.S. Cl.
CPC .............. *H04W 48/08* (2013.01); *H04W 16/14* (2013.01); *H04W 72/042* (2013.01)

(58) Field of Classification Search
None
See application file for complete search history.

(56) References Cited

U.S. PATENT DOCUMENTS

| | | | |
|---|---|---|---|
| 5,475,866 A | 12/1995 | Ruthenberg | |
| 2002/0177446 A1* | 11/2002 | Bugeja et al. | 455/450 |
| 2005/0250504 A1 | 11/2005 | Mikola | |
| 2007/0082632 A1 | 4/2007 | Liu | |
| 2007/0110004 A1* | 5/2007 | Liu et al. | 370/335 |
| 2008/0233991 A1 | 9/2008 | Gillig et al. | |
| 2009/0196180 A1* | 8/2009 | Bahl et al. | 370/235 |
| 2009/0207800 A1 | 8/2009 | Shan et al. | |
| 2009/0247201 A1* | 10/2009 | Ye et al. | 455/509 |
| 2010/0015969 A1* | 1/2010 | Lee et al. | 455/422.1 |
| 2010/0157910 A1 | 6/2010 | Nentwig et al. | |
| 2010/0173587 A1* | 7/2010 | Gan et al. | 455/62 |
| 2011/0151887 A1 | 6/2011 | Hakola et al. | |

FOREIGN PATENT DOCUMENTS

| | | |
|---|---|---|
| EP | 2034628 A1 | 3/2009 |
| WO | WO 2008032999 A2 * | 3/2008 |
| WO | 2010137777 A1 | 12/2010 |

OTHER PUBLICATIONS

Christodoulou, Christos G., "Cognitive Radio: The New Frontier for Antenna Design?", http://www.ieeeaps.org/pdfs/APSwebsite-Christos.pdf, retrieved Aug. 29, 2011, 8 pages.
Tang, Pak Kay, et al., "Performance of Secondary Radios in Spectrum Sharing with Prioritized Primary Access", Oct. 23-25, 2006, 7 pages.

(Continued)

*Primary Examiner* — Kouroush Mohebbi
(74) *Attorney, Agent, or Firm* — Squire Patton Boggs (US) LLP

(57) ABSTRACT

In accordance with an example embodiment of the present invention, a method comprises monitoring a bandwidth allocation of a primary device via monitoring at least one broadcast message sent from an associated base station; determining whether a secondary bandwidth is available based on the monitored bandwidth allocation of the primary device; allocating the secondary bandwidth to a secondary application on a secondary device if the secondary bandwidth becomes available; keeping track of changes in the bandwidth allocation of the primary device; and returning the secondary bandwidth to the primary device when the changes in the bandwidth allocation of the primary device indicates a need for the secondary bandwidth by the primary device.

20 Claims, 6 Drawing Sheets

(56) References Cited

OTHER PUBLICATIONS

Ghasemi, Amir, et al., "Spectrum Sensing in Cognitive Radio Networks: the Cooperation-Processing Tradeoff", Wireless Communications and Mobile Computing, May 17, 2007, pp. 1049-1060.

Nishimori, K., et al., "Interference Cancellation and Avoidance for Secondary Users Co-Existing with TDD-Based Primary Systems", Wireless Personal Communications, vol. 45, No. 3, Abstract, Feb. 27, 2008, 3 pages.

3GPP TSG RAN WG1 Meeting #59bis R1-100275, "Opportunities for Energy Savings in LTE Networks", Valencia, Spain, Jan. 18-22, 2010, 4 pages.

3GPP TSG RAN WG1 Meeting #59bis R1-100298, "Energy Saving at eNB", Valencia, Spain, Jan. 18-22, 2010, 2 pages.

International Search Report and Written Opinion, received in corresponding Patent Cooperation Treaty Application No. PCT/IB2011/051652. Dated Aug. 1, 2011. 15 Pages.

3 GPP TS 36.300 V8.12.0 (Mar. 2010) Technical Specification Overall description; Stage 2 (Release8); pp. 37-38.

Chinese Office Action dated Jan. 27, 2015, corresponding to Chinese Patent Appln. No. 201180019164.3.

* cited by examiner

METHODS AND APPARATUS FOR SECONDARY BANDWIDTH DETECTION AND ALLOCATION

TECHNICAL FIELD

The present application relates generally to a method and apparatus for secondary bandwidth detection and allocation.

BACKGROUND

Multiple network topologies may be integrated into a cellular network to support interworking of different types of applications in one network. For example, heterogeneous networks such as macros, micros, picos, femtos and relay networks may be supported along with long-term evolution (LTE) or LTE-advance (LTE-A) network on the same frequency spectrum.

Because multiple network systems may share the same frequency spectrum, some network system may be primary systems and some secondary systems. While a primary system user or device may use all or part of allocated frequency spectrum resources to meet its application needs, a secondary system user or device may engage in opportunistic usage of radio spectrum resources of the primary system. A secondary system user may utilize spectrum of the primary system opportunistically provided that the secondary system user does not degrade performance of or interfere with the primary user. For example, while a LTE user equipment may be a primary user, a secondary user may be a machine device with wireless communication capabilities.

SUMMARY

Various aspects of examples of the invention are set out in the claims.

According to a first aspect of the present invention, a method comprises monitoring a bandwidth allocation of a primary device via monitoring at least one broadcast message sent from an associated base station; determining whether a secondary bandwidth is available based on the monitored bandwidth allocation of the primary device; allocating the secondary bandwidth to a secondary application on a secondary device if the secondary bandwidth becomes available; keeping track of changes in the bandwidth allocation of the primary device; and returning the secondary bandwidth to the primary device when the changes in the bandwidth allocation of the primary device indicates a need for the secondary bandwidth by the primary device.

According to a second aspect of the present invention, an apparatus comprises at least one processor and at least one memory including computer program code. The at least one memory and the computer program code are configured to, with the at least one processor, cause the apparatus to perform at least the following: monitoring a bandwidth allocation of a primary device via monitoring at least one broadcast message sent from an associated base station; determining whether a secondary bandwidth is available based on the monitored bandwidth allocation of the primary device; allocating the secondary bandwidth to a secondary application on a secondary device if the secondary bandwidth becomes available; keeping track of changes in the bandwidth allocation of the primary device; and returning the secondary bandwidth to the primary device when the changes in the bandwidth allocation of the primary device indicates a need for the secondary bandwidth by the primary device.

According to a third aspect of the present invention, an apparatus comprises a secondary bandwidth module configured to determine whether a secondary bandwidth is available based on a bandwidth allocation to a primary device; and construct a field in a broadcast message indicating whether the secondary bandwidth is available. The apparatus also comprises an interface module configured to send the broadcast message including the indicator indicating whether the secondary bandwidth is available.

BRIEF DESCRIPTION OF THE DRAWINGS

For a more complete understanding of example embodiments of the present invention, reference is now made to the following descriptions taken in connection with the accompanying drawings in which.

DETAILED DESCRIPTION OF THE DRAWINGS

An example embodiment of the present invention and its potential advantages are understood by referring to FIGS. 1 through 6 of the drawings.

Figure 1:
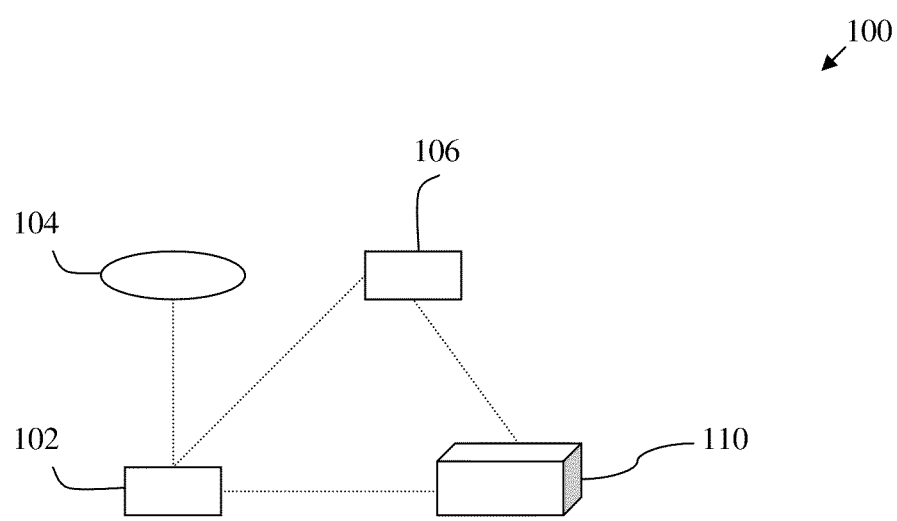
FIG. 1 illustrates an example wireless network with a secondary bandwidth detection capability in accordance with an example embodiment of the invention.

FIG. 1 illustrates an example wireless network 100 with a secondary bandwidth detection and allocation capability in accordance with an example embodiment of the invention. The network 100 includes a base station 110, a user equipment (UE) 102, a machine device 104 that is equipped with wireless communication capabilities, and a second user equipment 106. The base station 110 has active wireless connections with the user equipments 102 and 106 and an example of the base station 110 may be a long-term evolution (LTE) base station Node B (eNB). The machine device 104 has an active wireless connection with the user equipment 102.

In one example embodiment, the user equipment 102 is a $4^{th}$ generation (4G) mobile station that is configured with a capability to communicate with the machine device 104 in a device to device (D2D) or ad-hoc communication mode. At the same time the user equipment 106 is in an active communication session with the base station 110. For power saving or other purpose, the base station 110 may instruct the user equipment 106 to shrink the allocated bandwidth around a center frequency without affecting service quality when the network traffic is relatively low or some other conditions are met. At the same time, the user equipment 102 may monitor the bandwidth allocation changes in the cell on a continuing basis to detect an available secondary bandwidth. Upon detecting that a change of the bandwidth allocation to the user equipment 106, because the user equipment 106 shrank its allocation resource around the center frequency, a secondary bandwidth module of the UE 102 may determine that residual bandwidth left available by the UE 106 is available for a secondary user. The UE 102 at the same time happens to have a need to communicate with the machine device 104. In one example embodiment, the machine device 104 may be a TV or an appliance such as a refrigerator or a wash machine that is equipped to communicate wirelessly with the UE 102. The UE 102 may allocate the residual secondary bandwidth to a secondary application which may use the secondary bandwidth to engage in a short communication session with the machine device 104.

In one example embodiment, the bandwidth need of the UE 106 may increase to its original allocation. Upon detecting that the bandwidth allocation to the UE 106 has changed, the secondary bandwidth module of the UE 102 may terminate the use of the secondary bandwidth and returns the residual bandwidth to the UE 106. In another example embodiment, the UE 102 may be a primary device and secondary device at the same time. To allow local machine-to-machine communication or sensor network communication it may be feasible that a secondary device such as UE 102 may use spectrum without a need for signaling the base station 110. This may enable power saving by the machines/devices and prevent extensive signaling between the base station 110 and potentially a large number of machines or devices in a cellular network.

Figure 2:
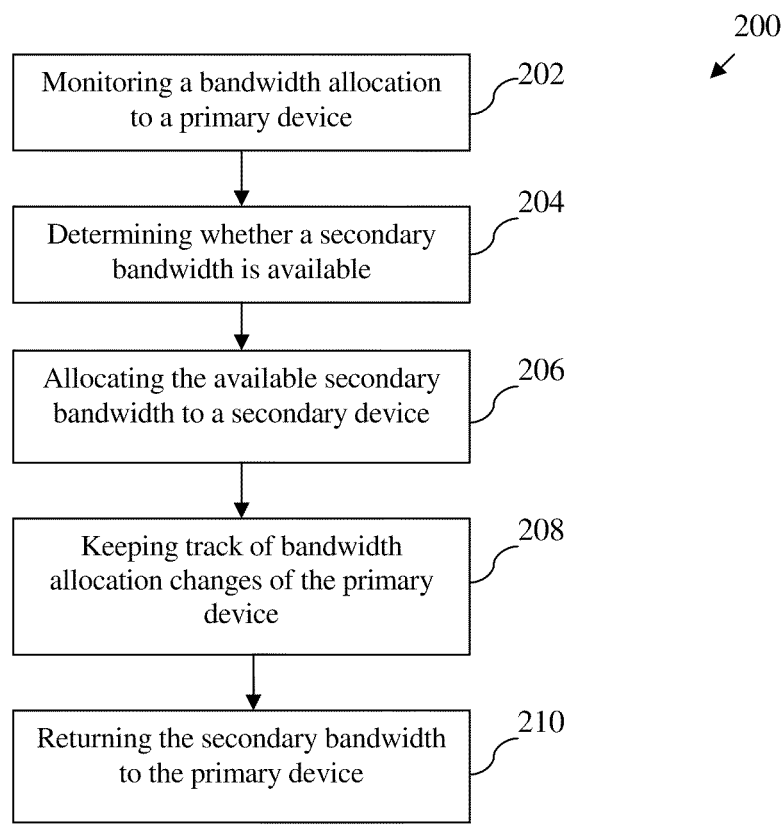
FIG. 2 illustrates an example method for secondary bandwidth detection and allocation in accordance with an example embodiment of the invention.

FIG. 2 illustrates an example method 200 for secondary bandwidth detection and allocation in accordance with an example embodiment of the invention. The method 200 includes monitoring bandwidth allocation to a primary device at block 202, determining whether a secondary bandwidth is available at block 204, and allocating the available secondary bandwidth to a secondary device at block 206. The method 200 also includes keeping track of changes of bandwidth allocation to the primary device at 208 and returning the secondary bandwidth to the primary device at block 210.

In one example embodiment, monitoring at a secondary device the bandwidth allocation to the primary device at block 202 may include monitoring broadcast messages sent from an associated base station. Monitoring the broadcast message may include receiving the broadcast message, decoding at least one of a main information block (MIB), a system information block (SIB) and a second system information block (SIB2) included in the broadcast message sent from the associated base station. In one embodiment, the associate base station is one of a LTE eNodeB or a generic fourth generation wireless base station. The secondary device may decode the MIB or SIB information and keep track of a current cell ID and a current bandwidth configuration combination. To help detect the bandwidth allocation change, the secondary device may store a maximum bandwidth configuration per detected cell in a register.

In one example embodiment, determining whether the secondary bandwidth is available at block 204 may include determining that the secondary bandwidth is available based on an indicator in the received SIB message. In one embodiment, the base station inserts an indicator in the MIB or SIB message to indicate whether a secondary bandwidth is available since the base station has the knowledge of bandwidth allocation changes. In this case, determining whether the secondary bandwidth is available at block 204 at the secondary device may include decoding the SIB or MIB information and reading the indicator of whether the secondary bandwidth is available. For example, the indicator in the SIB message may further include a single bit indicating whether a 20 mega hertz bandwidth is available in a current cell.

In one example embodiment, the secondary device may autonomously determine whether secondary bandwidth is available. In this case, determining whether the secondary bandwidth is available at block 204 may include comparing an uplink bandwidth allocation with a downlink bandwidth allocation and determining that the secondary bandwidth is available if the uplink bandwidth allocation is sufficiently less than the downlink bandwidth allocation for the primary device. In some cases, the secondary bandwidths are the bandwidths on the edges of a frequency resource allocated around a center frequency to the primary device. Thus determining whether the secondary bandwidth is available at block 204 may include detecting that edges of the bandwidth allocated to the primary device are unused by the primary device upon detecting that the current bandwidth configuration is less in the current cell than a previous bandwidth configuration stored in the register.

In one example embodiment, allocating the available secondary bandwidth to a secondary device at block 206 may include assigning the secondary bandwidth to a secondary application on a secondary device. The secondary application may include a communication to a D2D device, a machine device or a sensor network node. The secondary application is normally short, with a simple communication protocol without signaling to an associated base station and may be interrupted at any time, if the secondary bandwidth is returned to the primary device. The secondary device is authenticated by the associated network so it may receive the broadcast messages from the associated base station. In some cases, the primary device and secondary device may be the same device.

In one example embodiment, keeping track of bandwidth allocation change of the primary device at 208 is similar to monitoring the primary device's bandwidth allocations and thus may include receiving and decoding broadcast messages sent by the associated base station and detecting a bandwidth allocation change to the primary device. Keeping track of bandwidth allocation change of the primary device at 208 may also include updating the current bandwidth allocation in the register for each detected primary device in each detected cell.

In one example embodiment, returning the secondary bandwidth to the primary device at block 210 may include terminating the use of secondary bandwidth by the secondary device and making available to the primary device the secondary bandwidth. This may take place either when the primary device has a need for the secondary bandwidth or when an interference from using the secondary bandwidth reaches such a level that the primary device is affected.

Figure 6:
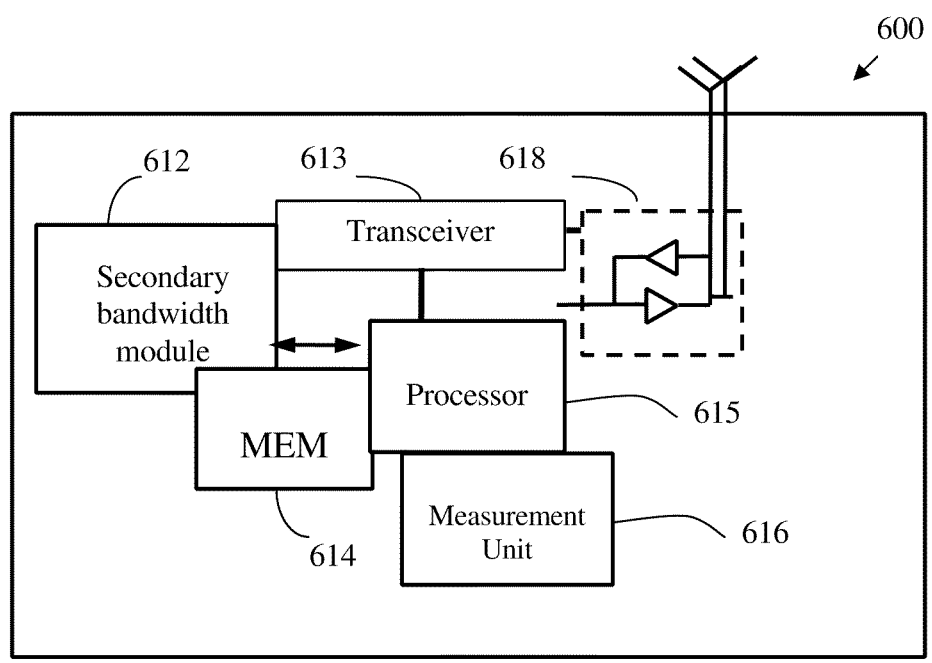
FIG. 6 illustrates an example wireless apparatus in accordance with an example embodiment of the invention.

In one example embodiment, the method 200 may be implemented in the UE 102 of FIG. 1 or by the apparatus 600 of FIG. 6. The method 200 is for illustration only and the steps of the method 200 may be combined, divided, or executed in a different order than illustrated, without departing from the scope of the invention of this example embodiment.

Figure 3:
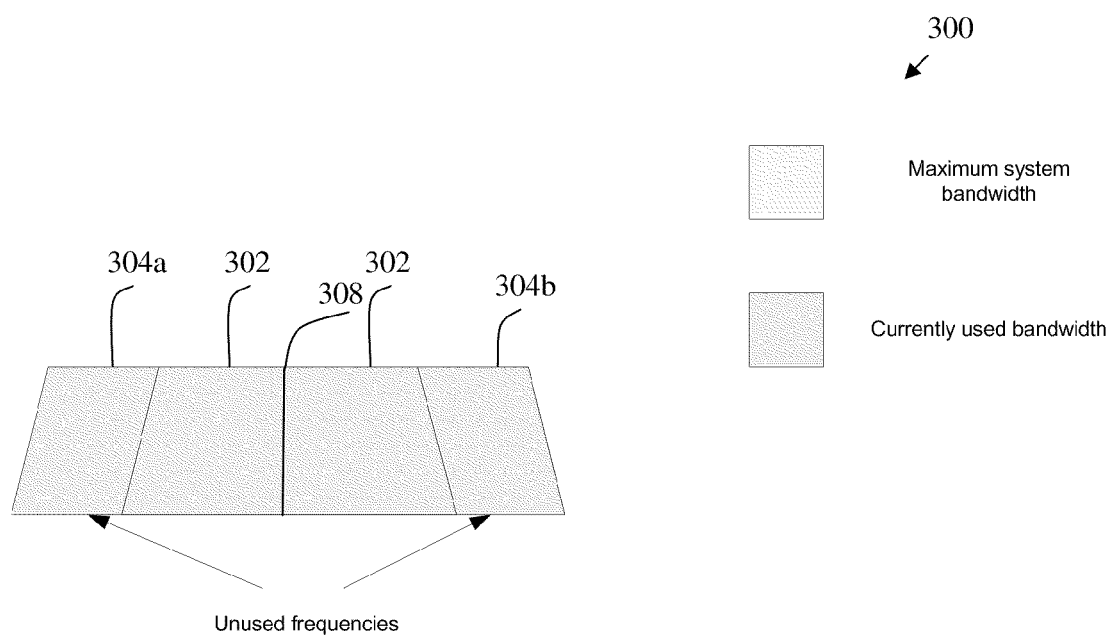
FIG. 3 illustrates an example primary bandwidth allocation and a secondary bandwidth allocation in accordance with an example embodiment of the invention.

FIG. 3 illustrates an example bandwidth allocation 300 in accordance with an example embodiment of the invention. The bandwidth allocation 300 includes a primary bandwidth allocation 302 and two secondary bandwidth allocations 304a and 304b. The primary bandwidth may be centered on a center frequency 308 within a maximum system bandwidth. In one example embodiment, the primary device may shrink its allocated bandwidth around the center frequency 308 for the purpose of power conservation upon receiving an instruction from the associated base station or on its own initiative. As a result, the residual secondary bandwidths 304a and 304b become available for some secondary devices.

Figure 4:
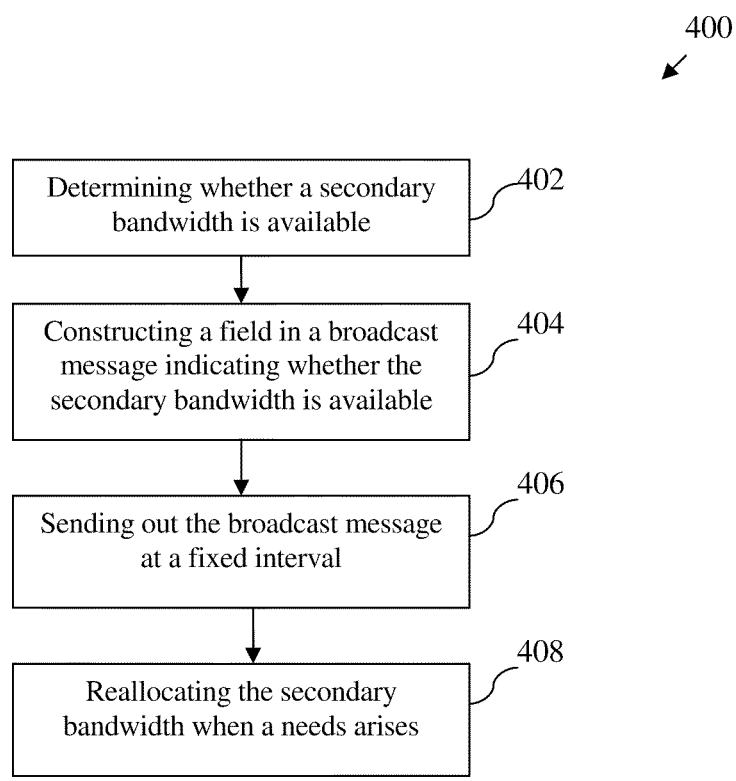
FIG. 4 illustrates an example method for secondary bandwidth allocation in accordance with an example embodiment of the invention.

FIG. 4 illustrates an example method 400 for secondary bandwidth allocation in accordance with an example embodiment of the invention. The method 400 includes determining whether a secondary bandwidth is available at block 402, and constructing a field indicating whether the secondary bandwidth is available at block 404. The method 400 may also include sending out the broadcast message at a fixed interval at block 406 and reallocating the secondary bandwidth when needs arise at block 408.

In one example embodiment, determining whether a secondary bandwidth is available at block 402 may include determining at an associated base station whether the secondary bandwidth is available based on stored current bandwidth allocation data and changes of primary device bandwidth allocations. Since the base station is responsible for allocating resources to the primary devices, the base station has the knowledge of the previous resource allocation and the current resource allocation. If the current resource allocation is less than the previous resource allocation, the secondary bandwidth may become available.

In one example embodiment, constructing a field in a broadcast message indicating whether the secondary bandwidth is available at block 404 may include creating a field in a main information block (MIB) of the broadcast message and indicate whether the secondary bandwidth is available. In one example embodiment, LTE Evolution Universal Terrestrial Radio Access (E-UTRA) radio resource control (RRC) protocol message may be used to convey the information of the secondary bandwidth allocation. The RRC message may include system information, which is divided into the field MasterInformationBlock (MIB) and a number of fields SystemInformationBlocks (SIBs). The MIB includes a limited number of essential and frequently transmitted parameters that are needed to acquire other information from the cell, and is transmitted on a broadcast channel. The SIB fields other than the field SystemInformationBlockType1 (SIB1) are carried in the SystemInformation (SI) messages and mapping of the SIB fields to the SI messages may be flexibly configurable by a field schedulingInfoList included in the field SystemInformationBlockType1. Some restrictions may apply to the SIB related information. For example, each SIB field is contained only in a single SI message, only the SIB fields having the same scheduling requirement (periodicity) may be mapped to the same SI message, and the field SystemInformationBlockType2 is always mapped to the SI message that corresponds to the first entry in the list of the SI messages in the field schedulingInfoList. There may be multiple SI messages transmitted with the same periodicity. The field SystemInformationBlockType1 and all SI messages may be transmitted on downlink shared channel (DL-SCH).

In one example embodiment, the MIB field of the LTE E-UTRA radio resource control (RRC) protocol message may be modified to include a "dl (downlink)-bandwidth" field indicating whether the downlink bandwidth in resource blocks is available, where one resource block includes 12 subcarriers. In Table 1 below, the notation n6 may represent 6 resource blocks, n15 represents 15 resource blocks, etc. The MIB data may be transmitted from the associated base station every 40 milliseconds (ms) and may contain 14 information bits and 10 spare bits. Since the MIB data is transmitted frequently, the amount of data bits in each MIB is relatively small. The 10 spare bits may be used to provide information on system-wide bandwidth allocation or deployment configuration. One of the 10 spare bits, a secondary-bandwidth flag, may be used to indicate that whether the cell has 100 subcarriers or 20 megahertz bandwidth available.

In an alternative embodiment, the system-wide deployment bandwidth may be indicated by three bits to indicate the number of carriers such as n15, n25, n50, n75, and n100 in the MIB as shown in Table 1. The use of secondary bandwidth may take place when the deployment bandwidths are less than 20 MHz but above the minimum deployment bandwidth of 1.4 MHz.

TABLE 1

Part of an example Master Information Block (MIB) field

| | |
|---|---|
| -- ASN1START | |
| MasterInformationBlock ::= | SEQUENCE { |
| dl-Bandwidth | ENUMERATED { |
| | n6, n15, n25, n50, n75, n100}, |
| phich-Config | PHICH-Config, |
| systemFrameNumber | BIT STRING (SIZE (8)), |
| spare | BIT STRING (SIZE (10)) |
| } | |

In one example embodiment, a RRC message may be used to indicate uplink bandwidth allocation. The E-UTRA RRC specification defines the following format for a SIB2 field, depicted in Table 2 below, which includes some example fields. The uplink (UL) bandwidth of the cell is indicated in the "ul-Bandwidth" field. Table 2 shows 6 options, similarly to the MIB downlink bandwidth field (n6 indicating 6 resource blocks, etc.), and the field is optional. If the field is absent, the uplink bandwidth allocation is equal to the downlink bandwidth allocation. The secondary device may obtain the following information from a SIB2 field included in the RRC message to detect the bandwidth allocation change of the primary device: a) the cell's total bandwidth; and b) the presence or absence of the optional field. The example SIB2 field may provide more flexibility for indicating more precisely the amount of secondary bandwidth that may be available for a secondary device.

TABLE 2

Example SIB2 fields

| | |
|---|---|
| radioResourceConfigCommon | RadioResourceConfigCommonSIB, |
| ue-TimersAndConstants | UE-TimersAndConstants, |
| freqInfo | SEQUENCE { |
| ul-CarrierFreq | ARFCN-ValueEUTRA OPTIONAL, |
| ul-Bandwidth | ENUMERATED {n6, n15, n25, n50, n75, n100} OPTIONAL, |

In one example embodiment, sending out the broadcast message at a fixed interval at block 406 may include sending out an LTE broadcast message including SIB2 fields and MIB contents. In one example embodiment, reallocating the secondary bandwidth at block 408 when needs arise may include re-assigning the secondary bandwidth to the primary device, the secondary bandwidth that was previously allocated to the secondary device. Reallocating the secondary bandwidth at block 408 may also include updating the resource allocation register to record the current resource allocation.

Figure 5:
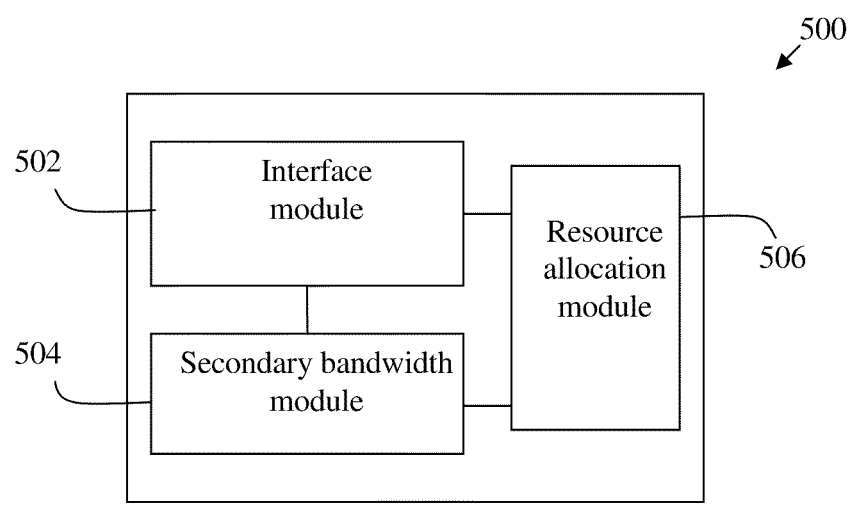
FIG. 5 illustrates an example apparatus for carrying out secondary bandwidth detection and allocation in accordance with an example embodiment of the invention.

In one example embodiment, the method 400 may be implemented in the base station 110 of FIG. 1 or by the apparatus 500 of FIG. 5. The method 400 is for illustration only and the steps of the method 400 may be combined, divided, or executed in a different order than illustrated, without departing from the scope of the invention of this example embodiment FIG. 5 illustrates an example apparatus 500 for carrying out secondary bandwidth detection and allocation in accordance with an example embodiment of the invention. The apparatus 500 includes an interface module 502, a secondary bandwidth module 504, and a resource allocation module 506.

In one example embodiment, the interface module 502 is configured to send broadcast messages that may include an indicator indicating whether the secondary bandwidth is available. The resource allocation module 506 is configured to allocate resources to associated UEs and keep track of the resource allocations in its local register or database.

In one example embodiment, the secondary bandwidth module 504 may be configured to determine whether a secondary bandwidth is available based on resource allocations to a primary device, and construct a field in a broadcast message indicating whether the secondary bandwidth is available. In one example embodiment, the secondary bandwidth module 504 may be configured to compare a LTE downlink bandwidth allocation with an uplink allocation for the primary device and determine that the secondary bandwidth is available if the uplink allocation is sufficiently less than the downlink allocation. The secondary bandwidth module 504 may also be configured to instruct the primary device to shrink allocated bandwidth around a center frequency or shift center frequency for power saving purpose when an active application does not have a need for the entire allocated bandwidth and may reallocate the secondary bandwidth to the primary device when the primary device increases its bandwidth allocation. The secondary bandwidth module 504 may also be configured to cause a second broadcast message to be sent, indicating that the secondary bandwidth is re-allocated to the primary device.

The apparatus 500 may be part of the base station 110 of FIG. 1 or other network node. FIG. 5 illustrates one example of a secondary bandwidth apparatus, various changes may be made to the apparatus 500 without departing from the principles of the invention.

FIG. 6 illustrates an example wireless apparatus in accordance with an example embodiment of the invention. In FIG. 6, the wireless apparatus 600 may include a processor 615, a memory 614 coupled to the processor 615, and a suitable transceiver 613 (having a transmitter (TX) and a receiver (RX)) coupled to the processor 615, coupled to an antenna unit 618. The memory 614 may store programs such as a secondary bandwidth module 612. The wireless apparatus 600 may be at least part of a generic $4^{th}$ generation mobile station, or an LTE compliant user equipment.

The processor 615 or some other form of generic central processing unit (CPU) or special-purpose processor such as digital signal processor (DSP), may operate to control the various components of the wireless apparatus 600 in accordance with embedded software or firmware stored in memory 614 or stored in memory contained within the processor 615 itself. In addition to the embedded software or firmware, the processor 615 may execute other applications or application modules stored in the memory 614 or made available via wireless network communications. The application software may comprise a compiled set of machine-readable instructions that configures the processor 615 to provide the desired functionality, or the application software may be high-level software instructions to be processed by an interpreter or compiler to indirectly configure the processor 615.

In an example embodiment, the secondary bandwidth module 612 may be configured to monitor a bandwidth allocation of a primary device via monitoring at least one broadcast message sent from an associated base station, determine whether a secondary bandwidth is available based on the monitored bandwidth allocation of the primary device, and allocate the available secondary bandwidth to a secondary application on a secondary device. The secondary bandwidth module 612 is also configured to keep track of changes in the bandwidth allocation of the primary device, and return the secondary bandwidth to the primary device when the changes in the bandwidth allocation of the primary device indicates a need for the secondary bandwidth by the primary device.

In one example embodiment, the transceiver 613 is for bidirectional wireless communications with another wireless device. The transceiver 613 may provide frequency shifting, converting received RF signals to baseband and converting baseband transmit signals to RF, for example. In some descriptions a radio transceiver or RF transceiver may be understood to include other signal processing functionality such as modulation/demodulation, coding/decoding, interleaving/deinterleaving, spreading/despreading, inverse fast fourier transforming (IFFT)/fast fourier transforming (FFT), cyclic prefix appending/removal, and other signal processing functions. In some embodiments, the transceiver 613, portions of the antenna unit 618, and an analog baseband processing unit may be combined in one or more processing units and/or application specific integrated circuits (ASICs). Parts of the transceiver may be implemented in a field-programmable gate array (FPGA) or reprogrammable software-defined radio.

In an example embodiment, the antenna unit 618 may be provided to convert between wireless signals and electrical signals, enabling the wireless apparatus 600 to send and receive information from a cellular network or some other available wireless communications network or from a peer wireless device. In an embodiment, the antenna unit 618 may include multiple antennas to support beam forming and/or multiple input multiple output (MIMO) operations. As is known to those skilled in the art, MIMO operations may provide spatial diversity and multiple parallel channels which can be used to overcome difficult channel conditions and/or increase channel throughput. The antenna unit 618 may include antenna tuning and/or impedance matching components, RF power amplifiers, and/or low noise amplifiers.

As shown in FIG. 6, the wireless apparatus 600 may further include a measurement unit 616, which measures the signal strength level that is received from another wireless device, and compare the measurements with a configured threshold. The measurement unit may be utilized by the wireless apparatus 600 in conjunction with various exemplary embodiments of the invention, as described herein.

In general, the various exemplary embodiments of the wireless apparatus 600 may include, but are not limited to, part of a user equipment, or a wireless device such as a portable computer having wireless communication capabilities, Internet appliances permitting wireless Internet access and browsing, as well as portable units or terminals that incorporate combinations of such functions. In one embodiment, the wireless apparatus 600 may be implemented in the UEs 102 or 106 of FIG. 1.

Without in any way limiting the scope, interpretation, or application of the claims appearing below, a technical effect of one or more of the example embodiments disclosed herein is to enable an efficient and flexible bandwidth allocation by allowing the secondary bandwidth to be used in a newer generation of network such as LTE-A network with minimal assistance from the network. Another technical effect is to allow the base station and UEs to conserve power while the radio resources could be efficiently used by the secondary devices.

Embodiments of the present invention may be implemented in software, hardware, application logic or a combination of software, hardware and application logic. The software, application logic and/or hardware may reside on a user equipment, a base station or an access point. If desired, part of the software, application logic and/or hardware may reside on access point, part of the software, application logic and/or hardware may reside on a network element such as a UE, and part of the software, application logic and/or hardware may reside on a peer network element such as a base station or an access point. In an example embodiment, the application logic, software or an instruction set is maintained on any one of various conventional computer-readable media. In the context of this document, a "computer-readable medium" may be any media or means that can contain, store, communicate, propagate or transport the instructions for use by or in connection with an instruction execution system, apparatus, or device, such as a computer, with one example of a computer described and depicted in FIG. 5. A computer-readable medium may comprise a computer-readable storage medium that may be any media or means that can contain or store the instructions for use by or in connection with an instruction execution system, apparatus, or device, such as a computer.

If desired, the different functions discussed herein may be performed in a different order and/or concurrently with each other. Furthermore, if desired, one or more of the above-described functions may be optional or may be combined.

Although various aspects of the invention are set out in the independent claims, other aspects of the invention comprise other combinations of features from the described embodiments and/or the dependent claims with the features of the independent claims, and not solely the combinations explicitly set out in the claims.

It is also noted herein that while the above describes example embodiments of the invention, these descriptions should not be viewed in a limiting sense. Rather, there are several variations and modifications which may be made without departing from the scope of the present invention as defined in the appended claims.

What is claimed is:

1. A method, comprising
    receiving a current bandwidth allocation of a primary device via receiving at least one broadcast message sent from an associated base station;
    determining whether a secondary bandwidth is available by comparing a maximum bandwidth configuration with the received current bandwidth allocation of the primary device, wherein the secondary bandwidth is available if the received current bandwidth allocation is less than the maximum bandwidth configuration, and the secondary bandwidth corresponds to a portion of the maximum bandwidth configuration that is unused by the received current bandwidth allocation;
    allocating the secondary bandwidth to a secondary application on a secondary device if the secondary bandwidth becomes available;
    keeping track of changes in the bandwidth allocation of the primary device; and
    returning the secondary bandwidth to the primary device when the changes in the bandwidth allocation of the primary device indicates a need for the secondary bandwidth by the primary device.

2. The method of claim 1 wherein receiving the at least one broadcast message comprises receiving at least one of a main information block (MIB) and a system information block (SIB) included in the broadcast message sent from an associated long-term evolution node B (eNB).

3. The method of claim 2 wherein determining whether the secondary bandwidth is available is based on an indicator in the received broadcast message.

4. The method of claim 3 wherein the indicator is included in the at least one of the SIB and the MIB and the indicator comprises a single bit to indicate whether a 20 megahertz bandwidth is available in a current cell.

5. The method of claim 4 wherein determining whether the secondary bandwidth is available comprises comparing an uplink bandwidth allocation with a downlink bandwidth allocation and determining that the secondary bandwidth is available if the uplink bandwidth allocation is sufficiently smaller than the downlink bandwidth allocation for the primary device.

6. The method of claim 1 wherein receiving the bandwidth allocation of the primary device comprises keeping track of a current cell identifier and a current bandwidth configuration combination and keeping a maximum bandwidth configuration per detected cell in a register.

7. The method of claim 6 wherein determining whether the secondary bandwidth is available comprises detecting that edges of the bandwidth allocation of the primary device are unused by the primary device upon detecting that the current bandwidth configuration is less than a previous bandwidth configuration stored in the register for a current cell.

8. The method of claim 1 wherein keeping track of the changes in bandwidth allocation of the primary device comprises receiving and decoding broadcast messages sent by the associated base station and detecting a bandwidth allocation change for the primary device.

9. The method of claim 8 wherein returning the secondary bandwidth to the primary device further comprises reallocating the secondary bandwidth to the primary device when an interference from use of the secondary bandwidth by the secondary device reaches such a level that use of the primary bandwidth by the primary device is affected.

10. An apparatus, comprising:
    at least one processor; and
    at least one memory including computer program code,
    the at least one memory and the computer program code configured to, with the at least one processor, cause the apparatus to perform at least the following:
    receiving a current bandwidth allocation of a primary device via receiving at least one broadcast message sent from an associated base station;
    determining whether a secondary bandwidth is available by comparing a maximum bandwidth configuration with the received current bandwidth allocation of the primary device, wherein the secondary bandwidth is available if the received current bandwidth allocation is less than the maximum bandwidth configuration, and the secondary bandwidth corresponds to a portion of the maximum bandwidth configuration that is unused by the received current bandwidth allocation;

allocating the secondary bandwidth to a secondary application on a secondary device if the secondary bandwidth becomes available;
keeping track of changes in the bandwidth allocation of the primary device; and
returning the secondary bandwidth to the primary device when the changes in the bandwidth allocation of the primary device indicates a need for the secondary bandwidth by the primary device.

11. The apparatus of claim 10 wherein receiving the bandwidth allocation of the primary device further comprises receiving and decoding system information contained in the at least one broadcast message on a broadcast channel.

12. The apparatus of claim 11 wherein receiving the at least one broadcast message comprises receiving at least one of a system information block (SIB) and a main information block (MIB) included in the at least one broadcast message sent by a long-term evolution node B (eNB).

13. The apparatus of claim 10 wherein the secondary bandwidth is at edge of an uplink bandwidth allocated to the primary device and wherein the secondary application is one of a device-to-device application, a sensory network application, and an ad-hoc network application without a signaling message going to the associated base station.

14. The apparatus of claim 10 wherein the secondary bandwidth comprises at least one orthogonal frequency-division multiplexing (OFDM) subcarrier.

15. The apparatus of claim 10 wherein the apparatus is authenticated by an associated network and the apparatus is also the primary device.

16. The apparatus of claim 10 wherein the at least one memory and the computer program code is further configured to cause the apparatus to receive and decode broadcast messages from more than one cell.

17. An apparatus comprising:
a secondary bandwidth module configured to
determine whether a secondary bandwidth is available by comparing a maximum bandwidth configuration with a current bandwidth allocation to a primary device, wherein the secondary bandwidth is available if the current bandwidth allocation is less than the maximum bandwidth configuration, and the secondary bandwidth corresponds to a portion of the maximum bandwidth configuration that is unused by the current bandwidth allocation; and
construct a field in a broadcast message indicating whether the secondary bandwidth is available; and
an interface module configured to send the broadcast message including the indicator indicating whether the secondary bandwidth is available, wherein the broadcast message is sent from a base station.

18. The apparatus of claim 17 wherein the secondary bandwidth module is further configured to instruct the primary device to shrink an allocated bandwidth around a center frequency or shift the center frequency to save power.

19. The apparatus of claim 18 wherein the secondary bandwidth module is configured to determine whether the secondary bandwidth is available via at least one of:
comparing a downlink bandwidth allocation with an uplink allocation for the primary device; and
determining that the secondary bandwidth is available if the uplink allocation is sufficiently less than the downlink allocation.

20. The apparatus of claim 17 wherein
the secondary bandwidth module is further configured to
reallocate the secondary bandwidth to the primary device when the primary device increases its bandwidth allocation;
construct a field in a second broadcast message indicating that the secondary bandwidth is re-allocated to the primary device; and
the interface module is further configured to broadcast the second broadcast message.

* * * * *